US011668354B2

(12) United States Patent
Yamashita (10) Patent No.: US 11,668,354 B2
(45) Date of Patent: Jun. 6, 2023

(54) DETERMINATION DEVICE AND DETERMINATION METHOD (71) Applicant: ISUZU MOTORS LIMITED, Tokyo (JP)

(72) Inventor: Akihiro Yamashita, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/793,288

(22) PCT Filed: Jan. 13, 2021

(86) PCT No.: PCT/JP2021/000752
§ 371 (c)(1),
(2) Date: Jul. 15, 2022

(87) PCT Pub. No.: WO2021/145324
PCT Pub. Date: Jul. 22, 2021

(65) Prior Publication Data
US 2023/0043258 A1 Feb. 9, 2023

(30) Foreign Application Priority Data
Jan. 17, 2020 (JP) .............................. JP2020-006413

(51) Int. Cl.
F16D 48/06 (2006.01)
F16D 23/06 (2006.01)
F16D 48/10 (2006.01)

(52) U.S. Cl.
CPC ........... F16D 23/06 (2013.01); F16D 48/066 (2013.01); F16D 48/10 (2013.01);
(Continued)

(58) Field of Classification Search
CPC ............................................ F16D 2500/10456
See application file for complete search history.

(56) References Cited

U.S. PATENT DOCUMENTS 9,890,854 B2 * 2/2018 Shirai ..................... F16H 61/18
2014/0005903 A1 1/2014 Hanai et al.

FOREIGN PATENT DOCUMENTS

JP 2011-144853 A 7/2011
JP 2012-013106 A 10/2012
(Continued)

OTHER PUBLICATIONS

Patent Cooperation Treaty, ISA/237, Application No. PCT/JP2021/000752, dated Feb. 24, 2021, in 5 pages.
(Continued)

Primary Examiner — Timothy Hannon
(74) Attorney, Agent, or Firm — Procopio, Cory, Hargreaves & Savitch LLP (57) ABSTRACT The present invention comprises: a synchronization start determination unit 110 for determining a synchronization start of a synchronization device 70; a half-clutch determination unit 130 for determining whether a clutch device 20 is in a half-clutch state where the clutch device has not been switched from a connection state to a disconnection state; and a damage determination unit 140 which, when the synchronization start determination unit 110 has determined the synchronization start and if the half-cutch determination unit 130 has determined a half-clutch state, determines that damage is applied to the synchronization device 70 caused by the differential rotation between the power transmitted from a driving force source 10 side via the clutch device 20 and the power transmitted from a driving wheels 16L, 16R side.

6 Claims, 3 Drawing Sheets (52) U.S. Cl.
CPC ........... *F16D 2500/1082* (2013.01); *F16D 2500/10456* (2013.01); *F16D 2500/3026* (2013.01); *F16D 2500/3067* (2013.01); *F16D 2500/30415* (2013.01); *F16D 2500/30426* (2013.01); *F16D 2500/3166* (2013.01); *F16D 2500/31413* (2013.01); *F16D 2500/50296* (2013.01); *F16D 2500/5102* (2013.01); *F16D 2500/5124* (2013.01); *F16D 2500/7101* (2013.01)

(56) References Cited

FOREIGN PATENT DOCUMENTS

| JP | 2014-009702 A | 1/2014 |
| JP | 2018-076950 A | 5/2018 |

OTHER PUBLICATIONS

Patent Cooperation Treaty, International Search Report, Application No. PCT/JP2021/000752, dated Feb. 24, 2021, in 3 pages.

\* cited by examiner

DETERMINATION DEVICE AND DETERMINATION METHOD

CROSS-REFERENCE TO RELATED APPLICATIONS

This application is US National Stage of International Patent Application PCT/JP2021/000752, filed Jan. 13, 2021, which claims benefit of priority from Japanese Patent Application JP2020-006413, filed Jan. 17, 2020, the contents of both of which are incorporated herein by reference.

TECHNICAL FIELD

The present disclosure relates to a determination device and a determination method, and particularly to a technique for determining damage imparted to a synchronization device of a manual transmission.

BACKGROUND ART

In general, a stepped manual transmission is configured to establish a power transmission path of a desired gear position by a synchronization device synchronously coupling a transmission gear corresponding to each gear position to a shaft in response to a driver's shift operation after a clutch device is switched to a disconnection state in which transmission of power is interrupted in response to driver's depression of a clutch pedal (see, for example, Patent Literatures 1 and 2).

CITATION LIST

Patent Literature

Patent Literature 1: JP-A-2011-144853
Patent Literature 2: JP-A-2012-013106

SUMMARY OF INVENTION

Technical Problem

The synchronization device absorbs differential rotation between an input side and an output side each time gear shifting is performed. Therefore, particularly in a half-clutch state in which the driver's depression of the clutch pedal is insufficient, when the synchronization device performs a synchronization operation, significant damage is imparted to a synchronization element (for example, a synchronizer ring and the like), and there is a problem that a life of the synchronization device is shortened.

A technique of the present disclosure has been made in view of the above circumstances, and an object of the present disclosure is to effectively determine damage imparted to a synchronization device.

Solution to Problem

A device according to the present disclosure is a determination device configured to determine damage imparted to a synchronization device. In a power transmission system including: a clutch device configured to switch between a connection state in which power from a driving force source is transmitted and a disconnection state in which power transmission is interrupted; and a transmission configured to transmit, by gear shifting at a predetermined gear ratio, power from the clutch device to a driving wheel by synchronously coupling a transmission gear to a shaft by the synchronization device, the determination device includes: a synchronization start determination unit configured to determine synchronization start of the synchronization device; a half-clutch determination unit configured to determine whether the clutch device is in a half-clutch state in which the clutch device is not switched from the connection state to the disconnection state; and a damage determination unit configured to determine that damage due to differential rotation between power transmitted from the driving force source via the clutch device and power transmitted from the driving wheel is imparted to the synchronization device the synchronization start determination unit determines the synchronization start and the half-clutch determination unit determines that the clutch device is in the half-clutch state.

Preferably, the determination device further includes a clutch stroke sensor configured to detect a clutch stroke amount of the clutch device according to a depression amount of a clutch pedal by a driver, and the half-clutch determination unit determines that the clutch device is in the half-clutch state when the clutch stroke amount detected by the clutch stroke sensor is equal to or less than a predetermined threshold value.

Preferably, the determination device further includes a neutral switch turned ON when the synchronization device is in a neutral state and turned OFF when the neutral state is released, and the synchronization start determination unit determines the synchronization start when a predetermined threshold time elapses from a time when the neutral switch is switched from ON to OFF.

Preferably, the determination device further includes a warning processing unit configured to issue a warning to the driver when the damage determination unit determines that the damage is imparted.

Preferably, the determination device further includes a synchronization completion determination unit configured to determine synchronization completion of the synchronization device, and the warning processing unit terminates the warning when the synchronization completion determination unit determines the synchronization completion.

A method according to the present disclosure is a determination method for determining damage imparted to the synchronization device. In a power transmission system including: a clutch device configured to switch between a connection state in which power from a driving force source is transmitted and a disconnection state in which power transmission is interrupted; and a transmission configured to transmit, by gear shifting at a predetermined gear ratio, power from the clutch device to a driving wheel by synchronously coupling a transmission gear to a shaft by the synchronization device, the determination method includes: determining synchronization start of the synchronization device; determining whether the clutch device is in a half-clutch state in which the clutch device is not switched from the connection state to the disconnection state; and determining that damage due to differential rotation between power transmitted from the driving force source via the clutch device and power transmitted from the driving wheel is imparted to the synchronization device when the synchronization start is determined and the half-clutch state is determined.

Advantageous Effects of Invention

According to the technique of the present disclosure, it is possible to effectively determine damage imparted to a synchronization device.

DESCRIPTION OF EMBODIMENTS

Hereinafter, a determination device and a determination method according to the present embodiment will be described with reference to the accompanying drawings. The same components are denoted by the same reference signs, and names and functions of these components are also the same. Therefore, a detailed description of the same components is not repeated.

[Overall Configuration]

Figure 1:
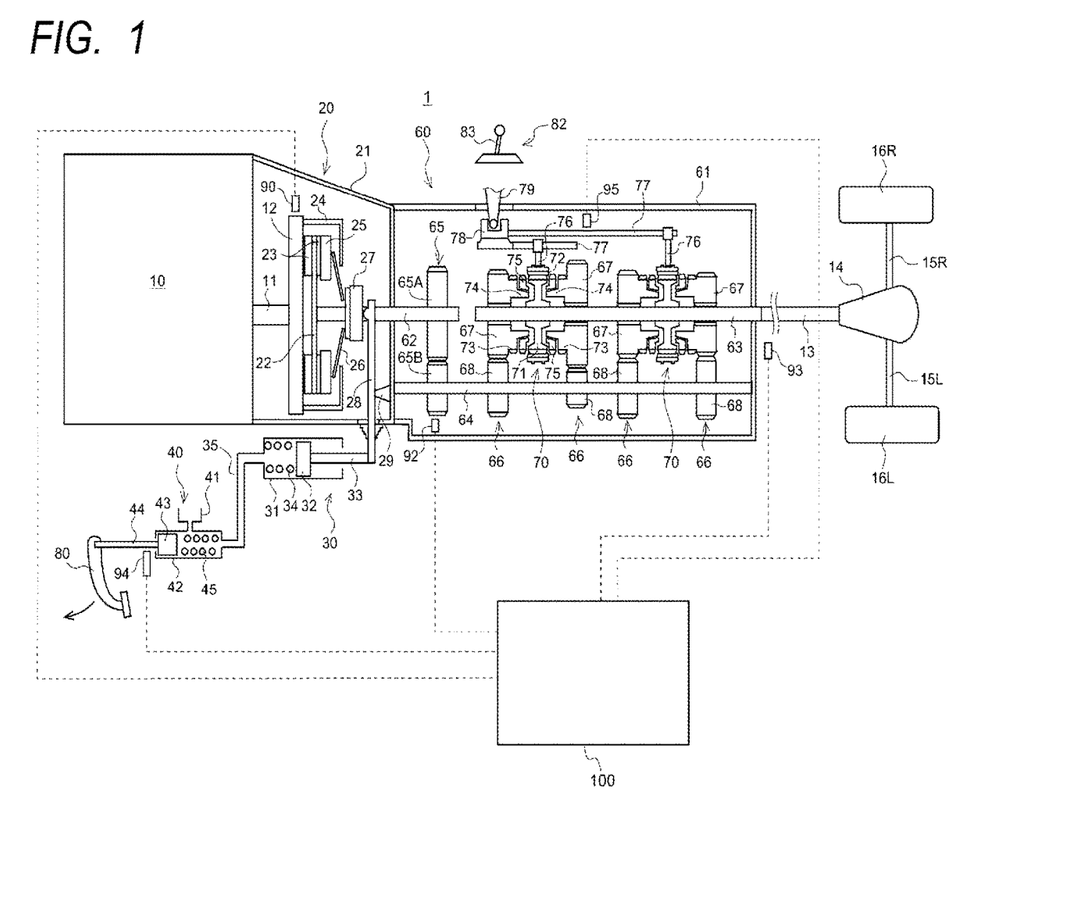
FIG. 1 is a schematic overall configuration diagram showing a power transmission system of a vehicle according to the present embodiment.

FIG. 1 is a schematic overall configuration diagram showing a power transmission system of a vehicle 1 according to the present embodiment.

An engine 10 is mounted on the vehicle 1 as an example of a driving force source. An input shaft 62 of a transmission 60 is connected to a crankshaft 11 of the engine 10 via a clutch device 20. A propeller shaft 13 is connected to an output shaft 63 (an example of a shaft of the present disclosure) of the transmission 60. Left and right driving wheels 16L and 16R are connected to the propeller shaft 13 via a differential gear device 14 and left and right drive shafts 15L and 15R, respectively.

The driving force source of the vehicle 1 is not limited to the engine 10, and may be a traction motor or a combination thereof. The vehicle 1 may be a rear wheel drive vehicle, a front wheel drive vehicle, a four-wheel drive vehicle, or an all-wheel drive vehicle.

The clutch device 20 is, for example, a dry single-plate clutch, and an output side end of the crankshaft 11 and an input side end of the input shaft 62 are arranged in a clutch housing 21.

A clutch disk 22 is provided at an input end of the input shaft 62 so as to be movable in an axial direction. The clutch disk 22 includes a damper spring (not shown) and a clutch facing 23.

A flywheel 12 is fixed to an output end of the crankshaft 11, and a clutch cover 24 is provided on a rear side surface of the flywheel 12. A pressure plate 25 and a diaphragm spring 26 are arranged between the flywheel 12 and the clutch cover 24.

A release fork 28 is provided to be pivotable about a fulcrum 29. One end side of the release fork 28 is accommodated in the clutch housing 21, and the other end side thereof is protruded to the outside of the clutch housing 21.

The release bearing 27 is provided between an inner peripheral edge of the diaphragm spring 26 and one end portion of the release fork 28, and enables the diaphragm spring 26 and the release fork 28 to rotate relative to each other. The release bearing 27 is moved to an output side (a right direction in the figure) by an elastic force of the diaphragm spring 26 when the clutch device 20 is switched from a "disconnection state" in which transmission of the power is interrupted to a "connection state" in which the power is transmitted, and is pushed by the release fork 28 and moved to an input side (a left direction in the figure) when the clutch device 20 is switched from the "connection state" to the "disconnection state". The clutch device 20 is not limited to a push type in the illustrated example, and may be of a pull type.

A release cylinder 30 is provided outside the clutch housing 21. The release cylinder 30 includes a piston 32 movably accommodated inside a cylinder body 31 and defining a hydraulic chamber, a push rod 33 having a base end fixed to the piston 32 and a distal end brought into contact with the release fork 28, and a spring 34 provided in the cylinder body 31 and holding the push rod 33 between the piston 32 and the release fork 28. The release cylinder 30 is connected to a master cylinder 40 via a pipe 35.

The master cylinder 40 includes a reserve tank 41 storing hydraulic oil, a piston 43 movably accommodated inside a cylinder body 42 and defining a hydraulic chamber, a rod 44 having a base end fixed to the piston 43 and a distal end coupled to a clutch pedal 80, and a return spring 45 provided in the hydraulic chamber and biasing the piston 43. Further, the master cylinder 40 is provided with a clutch stroke sensor 94 capable of detecting a clutch stroke amount S based on a movement amount of the rod 44.

When the driver depresses the clutch pedal 80, the piston 32 moves integrally with the push rod 33 by the hydraulic oil pressure supplied from the master cylinder 40 to the release cylinder 30, and the release fork 28 rotates counterclockwise as shown in the figure to press the release bearing 27, whereby the clutch device 20 is switched from the "connection state" to the "disconnection state". On the other hand, when the driver releases the clutch pedal 80, the clutch facing 23 of the clutch disk 22 is pressed against the flywheel 12 by the elastic force of the diaphragm spring 26, whereby the clutch device 20 is switched from the "disconnection state" to the "connection state". Hereinafter, a state in which power (torque) is transmitted from the flywheel 12 side to the clutch disk 22 side while the flywheel 12 and the clutch disk 22 rotate at different rotation speeds is referred to as a "half-clutch state" of the clutch device 20.

The transmission 60 is a manual transmission that performs a shift operation in response to a driver's operation of a shift operating device 82 provided in a driver's cab, and a transmission case 61 mainly includes an input shaft 62, an output shaft 63, a counter shaft 64, an input gear train 65, a plurality of output gear trains 66, a plurality of synchronization devices 70, and the like. The transmission 60 is not limited to an input reduction type in the illustrated example, and may be an output reduction type.

The input gear train 65 includes an input main gear 65A provided to be integrally rotatable with the input shaft 62, and an input counter gear 65B provided to be rotatable integrally with the counter shaft 64 and always meshing with the input main gear 65A.

The input gear train 65 is not limited to one train in the illustrated example, and may be configured to include two trains that function as a splitter capable of switching between a low speed and a high speed. At least one of the input main gear 65A and the input counter gear 65B may be an idle gear that is rotatable relative to the shafts 62 and 64. In this case, the synchronization device 70 to be described later may be provided.

The plurality of output gear train 66 each include an output main gear 67 (an example of a transmission gear of the present disclosure) provided to be rotatable relative to the output shaft 63, and an output counter gear 68 provided to be rotatable integrally with the counter shaft 64 and always meshing with the output main gear 67. The output main gear 67 is selectively synchronously coupled to the output shaft 63 by the synchronization device 70.

In the illustrated example, the output main gear 67 is an idle gear, and the output counter gear 68 may be an idle gear. In this case, the synchronization device 70 may be provided on the counter shaft 64 side. Although not shown in the drawings, the synchronization device 70 corresponding to a directly coupling stage at which the input shaft 62 and the output shaft 63 are coupled may be provided.

The synchronization device 70 includes a hub 71 provided to be rotatable integrally with the output shaft 63, a sleeve 72 having inner circumferential teeth that always mesh with outer circumferential teeth of the hub 71, a dog gear 73 provided to be rotatable integrally with the output main gear 67, a tapered cone portion 74 provided on the dog gear 73, and a synchronizer ring 75 provided between the hub 71 and the dog gear 73. A shift fork 76 fixed to a shift rod 77 is engaged with the sleeve 72 so as to be integrally movable. The shift rod 77 is connected to an operation lever 83 of the shift operating device 82 via a shift block 78, a shift lever 79, a link mechanism (not shown), and the like.

In the synchronization device 70, when the operation lever 83 of the shift operation device 82 is shifted from a neutral position by the driver, the sleeve 72 is shifted in a shift direction by shift thrust transmitted via the link mechanism, the shift block 78, the shift rod 77, and the shift fork 76. When the synchronizer ring 75 is pressed in accordance with shift movement of the sleeve 72, a synchronous load is generated between the synchronizer ring 75 and the tapered cone portion 74. When the sleeve 72 and the dog gear 73 are rotated in synchronization due to the synchronous load, the sleeve 72 is further shifted and completely meshed with the dog gear 73, so that the output main gear 67 is selectively synchronously coupled to the output shaft 63.

In the following description, a time when the sleeve 72 shifts and presses the synchronizer ring 75 and the synchronous load starts to be generated between the synchronizer ring 75 and the tapered cone portion 74 is referred to as "synchronization start" of the synchronization device 70. A time when rotation of the sleeve 72 and the dog gear 73 is synchronized due to the synchronous load or when the sleeve 72 completely meshes (detent) with the dog gear 73 is referred to as "synchronization completion" of the synchronization device 70. Further, a state in which the sleeve 72 meshes with only the hub 71 is referred to as a "neutral state" of the synchronization device 70 or the transmission 60.

The vehicle 1 is provided with various sensors and switches. An engine rotation speed sensor 90 detects an engine rotation speed Ne from the flywheel 12 or the crankshaft 11. The transmission input rotation speed sensor 92 detects a transmission input rotation speed $NT_{In}$ from the input gear train 65 or the input shaft 62. A transmission output rotation speed sensor 93 detects a transmission output rotation speed $NT_{Out}$ or a vehicle speed V from the propeller shaft 13 or the output shaft 63. The vehicle speed V may be acquired from the driving wheels 16L and 16R or a steered wheel (not shown). The clutch stroke sensor 94 detects the clutch stroke amount S based on the movement amount of the rod 44. A neutral switch 95 detects a neutral state (ON/OFF) of the synchronization device 70 from the shift movement of the shift rod 77. Detection signals of the sensors 90 and 92 to 94 and the switch 95 are transmitted to an electrically connected control device 100.

In addition to the sensors 90 and 92 to 94 and the switch 95, the vehicle 1 may further include a shift stroke sensor capable of detecting a shift movement amount of the shift rod 77 or the shift block 78, a detent switch capable of detecting complete meshing (detent) between the sleeve 72 and the dog gear 73, and the like.

[Control Device]

Figure 2:
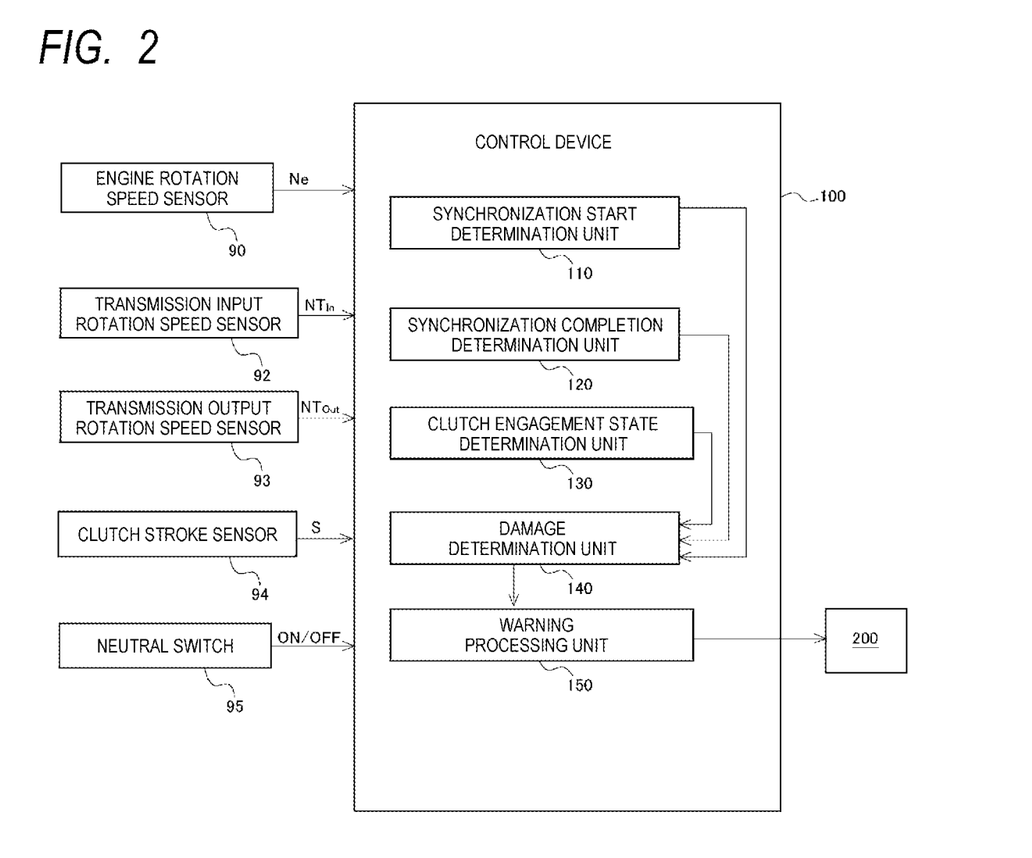
FIG. 2 is a schematic functional block diagram showing a control device according to the present embodiment and a related peripheral configuration.

FIG. 2 is a schematic functional block diagram showing the control device 100 according to the present embodiment and a related peripheral configuration.

The control device 100 is, for example, a device that performs an operation, such as a computer, includes a central processing unit (CPU), a read only memory (ROM), a random access memory (RAM), an input port, an output port, and the like connected to each other via a bus or the like, and executes a program. The control device 100 is, for example, an electronic control unit (ECU).

The control device 100 functions as a device including a synchronization start determination unit 110, a synchronization completion determination unit 120, a clutch engagement state determination unit 130 (a half-clutch determination unit of the present disclosure), a damage determination unit 140, and a warning processing unit 150 by executing the program. Although these functional elements are described as being included in the control device 100 which is an integrated hardware in the present embodiment, any part of these functional elements may be provided in separate hardware.

The synchronization start determination unit 110 determines "synchronization start" of the synchronization device 70 based on an ON/OFF signal transmitted from the neutral switch 95. Specifically, in a case where the shift rod 77 starts the shift movement in response to the driver's shift operation of the shift operating device 82 (the operation lever 83) and the neutral switch 95 is switched from ON to OFF in accordance with the shift movement, when an elapsed time T measured by a timer (not shown) built in the control device 100 from reception of the OFF signal reaches a predetermined threshold time $T_{Thv}$ (for example, several seconds), the synchronization start determination unit 110 determines the "synchronization start" of the synchronization device 70. Here, the threshold time $T_{Thv}$ may be set by obtaining, by an experiment or the like in advance, a time from the start of the shift movement of the shift rod 77 to the start of generation of the synchronous load between the synchronizer ring 75 and the tapered cone portion 74. A determination result by the synchronization start determination unit 110 is transmitted to the damage determination unit 140. The "synchronization start" of the synchronization device 70 may be determined based on a sensor value of a shift stroke sensor (not shown).

The synchronization completion determination unit 120 determines "synchronization completion" of the synchronization device 70. More specifically, after the synchronization device 70 starts a synchronization operation, when an increase or decrease in the transmission input rotation speed $NT_{In}$ transmitted from the transmission input rotation speed sensor 92 is inverted, the synchronization completion determination unit 120 determines the "synchronization completion" of the synchronization device 70. More specifically, when the transmission input rotation speed $NT_{In}$ changes from an increase to a decrease in a case of shift down, and when the transmission input rotation speed $NT_{In}$ changes from a decrease to an increase in a case of shift up, the synchronization completion determination unit 120 determines the "synchronization completion". A determination result by the synchronization completion determination unit 120 is transmitted to the damage determination unit 140.

The "synchronization completion" of the synchronization device 70 may be determined based on a shift stroke sensor (not shown), a detent switch, or the like. Alternatively, the synchronization completion may be determined when a rotation speed ratio between the transmission input rotation speed $NT_{In}$ acquired by the transmission input rotation speed sensor 92 and the transmission output rotation speed $NT_{Out}$ acquired by the transmission output rotation speed sensor 93 coincides with a gear ratio of a gear position after gear shifting.

Based on a sensor value of the clutch stroke sensor 94, the clutch engagement state determination unit 130 determines whether the clutch device 20 is in a "half-clutch state" in which power transmission is not completely interrupted, or the clutch device 20 is in a "disconnection state" in which the power transmission is completely interrupted.

Specifically, when the clutch stroke amount S acquired by the clutch stroke sensor 94 is equal to or less than a predetermined threshold value $S_{Thv}$ indicating that a depression amount of the clutch pedal 80 by the driver is not sufficient, the clutch engagement state determination unit 130 determines that the clutch device 20 is in the "half-clutch state". On the other hand, when the clutch stroke amount S acquired by the clutch stroke sensor 94 exceeds the predetermined threshold value $S_{Thv}$, the clutch engagement state determination unit 130 determines that the clutch device 20 is in the "disconnection state". Here, the predetermined threshold value $S_{Thv}$ may be set based on a clutch stroke amount that causes the clutch facing 23 to completely separate from the flywheel 12 in consideration of wear of the clutch facing 23 and the like. A determination result by the clutch engagement state determination unit 130 is transmitted to the damage determination unit 140.

When the driver performs a gear in operation in which the operation lever 83 of the shift operating device 82 is shifted from the neutral position, the damage determination unit 140 performs damage determination to determine whether significant damage is imparted to the synchronization element (mainly the synchronizer ring 75) of the synchronization device 70, the significant damage being caused by differential rotation between power transmitted from the engine 10 side via the clutch device 20 due to insufficient depression of the clutch pedal 80 and power transmitted from the driving wheels 16L and 16R side due to traveling of the vehicle 1.

Specifically, the damage determination unit 140 sets a damage flag F to ON (F=1) when the synchronization start determination unit 110 determines the "synchronization start" and the clutch engagement state determination unit 130 determines the "half-clutch state" in a state in which the engine rotation speed Ne transmitted from the engine rotation speed sensor 90 is equal to or higher than a predetermined threshold rotation speed $Ne_{Thv}$ (for example, about 200 rpm). Accordingly, it is possible to effectively determine the damage of the synchronization device 70 due to the insufficient depression of the clutch pedal 80 at the time of the gear in operation. When the clutch stroke amount S exceeds the predetermined threshold value $S_{Thv}$ or when the synchronization completion determination unit 120 determines the "synchronization completion" after the damage flag F is turned ON, the damage determination unit 140 switches the damage flag F from ON to OFF (F=0). A determination result by the damage determination unit 140 is transmitted to the warning processing unit 150.

When the damage determination unit 140 switches the damage flag F from OFF to ON, the warning processing unit 150 transmits an instruction signal indicating that the depression of the clutch pedal 80 is insufficient to a display device 200 in a driver's cab. Note that a warning method is not limited to the display by the display device 200, and may be a sound by a speaker or the like. A warning by the warning processing unit 150 is preferably terminated when the damage determination unit 140 switches the damage flag F from ON to OFF. In this way, by issuing a warning to appropriately notify the driver that the depression of the clutch pedal 80 is insufficient at the time of the gear in operation, it is possible to effectively prevent the damage imparted to the synchronization device 70 due to the half clutch at the time of the gear in operation.

Figure 3:
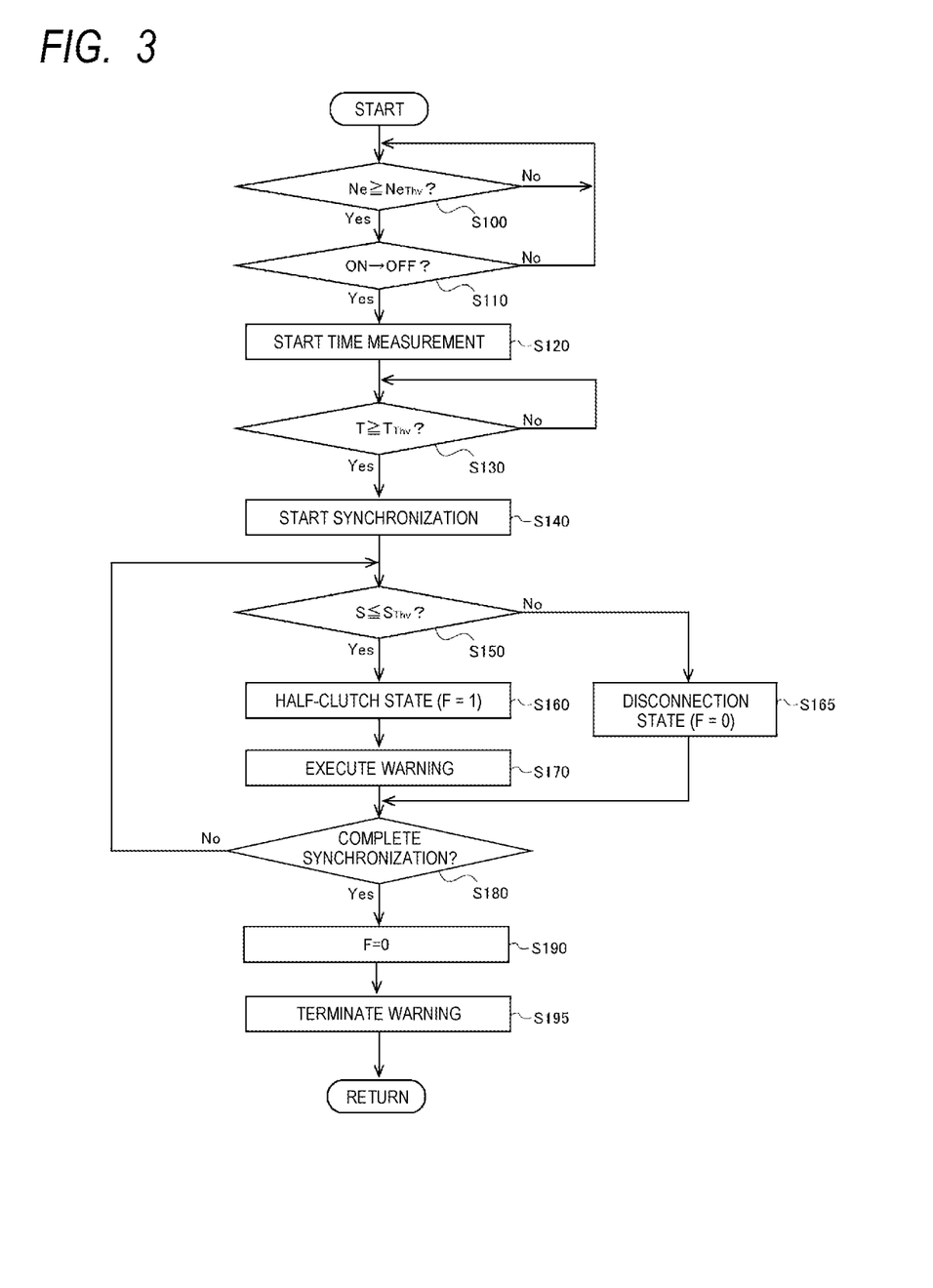
FIG. 3 is a flowchart illustrating determination processing of damage imparted to a synchronization device according to the present embodiment.

Next, a flow of determination processing of the damage imparted to the synchronization device 70 according to the present embodiment will be described with reference to FIG. 3. This routine preferably starts with start of the engine 10 (or traveling of the vehicle 1) and ends with stop of the engine 10 (or stop of the vehicle 1).

In step S100, it is determined whether the engine rotation speed Ne is equal to or higher than the predetermined threshold rotation speed $Ne_{Thv}$. When the engine rotation speed Ne is equal to or higher than the predetermined threshold rotation speed $Ne_{Thv}$ (Yes), the control proceeds to processing of step S110. On the other hand, when the engine rotation speed Ne is lower than the predetermined threshold rotation speed $Ne_{Thv}$ (No), the control repeats determination processing of step S100.

In step S110, it is determined whether the neutral switch 95 is switched from ON to OFF in accordance with the gear in operation of the driver. When the neutral switch 95 is switched from ON to OFF (Yes), the control proceeds to processing of step S120. On the other hand, when the neutral switch 95 is maintained ON (No), the control returns to the determination processing of step S100.

In step S120, time measurement is started by a timer built in the control device 100. Next, in step S130, it is determined whether the elapsed time T reaches the predetermined threshold time $T_{Thv}$. When the elapsed time T does not reach the threshold time $T_{Thv}$ (No), the control repeats determination processing of step S130. On the other hand, when the elapsed time T reaches the predetermined threshold time $T_{Thv}$ (Yes), the control proceeds to processing of step S140, and the synchronization device 70 is determined to be "synchronization start".

In step S150, it is determined whether the clutch stroke amount S is equal to or less than the predetermined threshold value $S_{Thv}$. When the clutch stroke amount S is equal to or less than the predetermined threshold value $S_{Thv}$ (Yes), the control proceeds to step S160, the clutch device 20 is determined to be in the "half-clutch state", and the damage flag F is switched from OFF (F=0) to ON (F=1). On the other hand, when the clutch stroke amount S exceeds the predetermined threshold value $S_{Thv}$ (No), the control proceeds to step S165, the clutch device 20 is determined to be in the "disconnection state", the damage flag F is maintained OFF (F=0), and the control proceeds to determination of step S180 to be described later. That is, even if the clutch device is once determined to be in the disconnection state, when the half-clutch state is reached before the determination of synchronization completion in step S180, this case is configured to be subject to an alarm.

In step S170, a warning that the depression of the clutch pedal 80 is insufficient is executed, and next, in step S180, the "synchronization completion" of the synchronization device 70 is determined. When the "synchronization completion" is not determined (No), the control returns to determination processing of step S150. That is, processing of steps S160 and S170 are repeated until the clutch stroke amount S exceeds the predetermined threshold value $S_{Thv}$, and when the clutch stroke amount S exceeds the predetermined threshold value $S_{Thv}$, the control proceeds to step S165, and the damage flag F is switched to OFF (F=0).

On the other hand, when the synchronization device 70 is determined to be "synchronization completion" in step S180 (Yes), the control proceeds to step S190, the damage flag F is returned to OFF (F=0), the warning is terminated in step S195, and then the control is returned.

According to the present embodiment described above in detail, when the depression of the clutch pedal 80 is insufficient at the time of the synchronization start of the synchronization device 70 due to the gear in operation, it is determined that damage is imparted to the synchronization device 70, and this is appropriately warned. Accordingly, it is possible to effectively prevent the damage imparted to the synchronization device 70 due to the half clutch at the time of the gear in operation, and it is possible to reliably prevent a decrease in the life of components of the synchronization device 70.

The warning is only issued at the time of the gear in operation in which the depression of the clutch pedal 80 is insufficient, and is not issued at the time of other operations that are not affected by the insufficient depression of the clutch pedal 80, for example, at the time of a gear disengagement operation, so that it is possible to effectively prevent inconvenience due to frequent occurrence of an erroneous alarm.

Further, the synchronization start of the synchronization device 70 is determined based on ON/OFF of the neutral switch 95, and the synchronization completion of the synchronization device 70 is determined based on a change in the transmission input rotation speed $NT_{In}$ acquired by the transmission input rotation speed sensor 92, so that the synchronization start and the synchronization completion can be determined without using a shift stroke sensor, a detent switch, a shift position sensor, or the like, and an increase in cost due to an increase in the number of sensors can be effectively prevented.

[Others]

The present disclosure is not limited to the above embodiment and can be appropriately modified and implemented without departing from the spirit of the present disclosure.

For example, the clutch device 20 exemplifies a dry single-plate clutch, but the present disclosure can be widely applied to other clutch devices that are engaged and disengaged in response to a driver's operation. The gear train and the like of the transmission 60 are not limited to the illustrated example, and can be widely applied to transmissions having other configurations. In the above embodiment, presence or absence of the damage to the synchronization device 70 is determined, but a function of calculating a fatigue level based on a difference between an input rotation speed and an output rotation speed of the synchronization device 70 and estimating the life of the synchronization device 70 may be added.

The present application is based on Japanese Patent Application No. 2020-006413 filed on Jan. 17, 2020, and contents thereof are incorporated herein as reference.

INDUSTRIAL APPLICABILITY

The determination device and the determination method of the present disclosure are useful in that damage imparted to a synchronization device can be effectively determined.

REFERENCE SIGNS LIST

1: vehicle
10: engine (driving force source)
11: crankshaft
16L, 16R: driving wheel
20: clutch device
60: transmission
62: input shaft
63: output shaft (shaft)
64: counter shaft
65: input gear train
66: output gear train
67: output main gear (transmission gear)
70: synchronization device
71: hub
72: sleeve
73: dog gear
74: tapered cone portion
75: synchronizer ring
76: shift fork
77: shift rod
78: shift block
79: shift lever
80: clutch pedal
82: shift operating device
83: operation lever
90: engine rotation speed sensor
92: transmission input rotation speed sensor
93: transmission output rotation speed sensor
94: clutch stroke sensor
95: neutral switch
100: control device
110: synchronization start determination unit
120: synchronization completion determination unit
130: clutch engagement state determination unit (half-clutch determination unit)
140: damage determination unit
150: warning processing unit

The invention claimed is:

1. A determination device configured to determine damage imparted to a synchronization device, in a power transmission system including: a clutch device configured to switch between a connection state in which power from a driving force source is transmitted and a disconnection state in which power transmission is interrupted; and a transmission configured to transmit, by gear shifting at a predetermined gear ratio, power from the clutch device to a driving wheel by synchronously coupling a transmission gear to a shaft by the synchronization device, the determination device comprising:

a synchronization start determination unit configured to determine synchronization start of the synchronization device;

a half-clutch determination unit configured to determine whether the clutch device is in a half-clutch state in which the clutch device is not switched from the connection state to the disconnection state; and a damage determination unit configured to determine that damage due to differential rotation between power transmitted from the driving force source via the clutch device and power transmitted from the driving wheel is imparted to the synchronization device when the synchronization start determination unit determines the synchronization start and the half-clutch determination unit determines that the clutch device is in the half-clutch state.

2. The determination device according to claim 1, further comprising:
a clutch stroke sensor configured to detect a clutch stroke amount of the clutch device according to a depression amount of a clutch pedal by a driver,
wherein the half-clutch determination unit determines that the clutch device is in the half-clutch state when the clutch stroke amount detected by the clutch stroke sensor is equal to or less than a predetermined threshold value.

3. The determination device according to claim 1, further comprising:
a neutral switch turned ON when the synchronization device is in a neutral state and turned OFF when the neutral state is released,
wherein the synchronization start determination unit determines the synchronization start when a predetermined threshold time elapses from a time when the neutral switch is switched from ON to OFF.

4. The determination device according to claim 1, further comprising:
a warning processing unit configured to issue a warning to the driver when the damage determination unit determines that the damage is imparted.

5. The determination device according to claim 4, further comprising:
a synchronization completion determination unit configured to determine synchronization completion of the synchronization device, wherein
the warning processing unit terminates the warning when the synchronization completion determination unit determines the synchronization completion.

6. A determination method for determining damage imparted to the synchronization device, in a power transmission system including: a clutch device configured to switch between a connection state in which power from a driving force source is transmitted and a disconnection state in which power transmission is interrupted; and a transmission configured to transmit, by gear shifting at a predetermined gear ratio, power from the clutch device to a driving wheel by synchronously coupling a transmission gear to a shaft by the synchronization device, the determination method comprising:
determining synchronization start of the synchronization device;
determining whether the clutch device is in a half-clutch state in which the clutch device is not switched from the connection state to the disconnection state; and
determining that damage due to differential rotation between power transmitted from the driving force source via the clutch device and power transmitted from the driving wheel is imparted to the synchronization device when the synchronization start is determined and the half-clutch state is determined.

* * * * *